United States Patent [19]

Noyes

[11] Patent Number: 5,213,770

[45] Date of Patent: May 25, 1993

[54] METHANE CONVERSION REACTOR

[75] Inventor: Gary P. Noyes, Broad Brook, Conn.

[73] Assignee: United Technologies Corporation, Hartford, Conn.

[21] Appl. No.: 542,667

[22] Filed: Jun. 25, 1990

Related U.S. Application Data

[60] Continuation of Ser. No. 276,590, Nov. 28, 1988, abandoned, which is a division of Ser. No. 128,370, Dec. 3, 1987, Pat. No. 4,836,898.

[51] Int. Cl.[5] .............................................. C10L 3/08
[52] U.S. Cl. ................................... 422/211; 48/127.9; 48/198.7; 422/197; 422/312
[58] Field of Search ....................... 422/211, 197, 312; 48/61, 196 A; 423/447.3, 453; 502/527

[56] References Cited

U.S. PATENT DOCUMENTS

| | | | |
|---|---|---|---|
| 3,340,011 | 9/1967 | Hoekstra | 423/453 |
| 3,873,328 | 3/1975 | Brueggemann et al. | 502/527 |
| 3,907,532 | 9/1975 | Roberts | 502/527 |
| 4,301,035 | 11/1981 | Risse | 252/455 R |
| 4,410,504 | 10/1983 | Galasso et al. | 423/453 |
| 4,452,676 | 6/1984 | Birbara et al. | 204/129 |
| 4,642,307 | 2/1987 | Wood et al. | 502/332 |
| 4,770,867 | 9/1988 | Coulou et al. | 423/447.3 |

OTHER PUBLICATIONS

"Formation of Dense Carbon on Fused-Quartz Wool for Spacecraft Life Support Application", From Advanced Ceramic Materials vol. 1, No. 2, 1986 by G. Noyes, D. Condit, R. Velfri and F. Galasso.

Primary Examiner—Robert J. Warden
Assistant Examiner—Timothy M. McMahon
Attorney, Agent, or Firm—Alan C. Cone

[57] ABSTRACT

The present invention discloses a methane converter comprising a reactor tube and a heating means to raise the reactor tube temperature to the desired reaction temperature wherein the reactor tube is packed with a high temperature stable, glass fibers the fibers having a layer of catalytic material on them. The present reactor operating at temperatures below 850° C. and producing hydrogen and high density carbon. Also disclosed is a carbon dioxide reclamation system utilizing the present methane converter.

5 Claims, 1 Drawing Sheet

METHANE CONVERSION REACTOR

This is a continuation of application Ser. No. 07/276,590, filed Nov. 28, 1988, now abandoned, which is a division of application Ser. No. 07/128,370, filed Dec. 3, 1987, now U.S. Pat. No. 4,836,898.

1. Technical Field

The field of art to which this invention pertains is methane reformation and carbon formation. This field also includes gas reclamation.

2. Background of the Invention

In many environments it is necessary to recapture oxygen from the exhaled carbon dioxide of mammals living in the environment. The most common of these situations would be a closed environment such as a submarine or a spacecraft. Generally, the reclamation process comprises passing the carbon dioxide gas through a concentrator and then directing the concentrated carbon dioxide to a carbon dioxide reduction system. Typically, the carbon dioxide reduction system results in the reaction ($CO_2 + 4H_2 \rightarrow H_2O + CH_4$). The resulting water may be electrolyzed to produce hydrogen and breathing oxygen, while the methane formed may be reacted to produce carbon and hydrogen; the hydrogen being useful in the operation of fuel cell batteries on board the vessel while the carbon would be a dispensable by-product.

A typical method for the conversion of methane useful in the above-mentioned system involves passing the methane either alone or in combination with another gas into a heated reactor tube and causing the methane to pyrolytically decompose to form $H_2$ and carbon. The carbon then remains in the reactor until such time as the build-up reduces the flow of methane into the reactor preventing the optimum operation of the reactor and necessitating its removal.

This carbon management poses a limitation on the operation of the system. U.S. Pat. No. 4,452,676 attempts to solve this problem by operating the conversion process at very high temperature, thereby creating a very dense carbon which occupies far less space in the reactor for the same quantity of methane converted, thereby allowing for longer operating cycles between cleanings.

However, the high temperatures required to operate such a reactor creates certain problems with the types of materials which may be used in the manufacture of the reactor and will also require significant energy consumption from a very limited energy source.

An alternative methane conversion system is referred to as the Bosch process, wherein the methane conversion temperatures necessary in the the reactor vessel are about 700° C., significantly lower than the temperatures required in the prior process described above, thereby reducing the consumption of energy required for the process. The lower operating temperatures are achieved by the introduction of an expendable iron catalyst into the reaction vessel. However, although the reaction takes place at a lower temperature, the resulting carbon has a lower packing density and therefore, requires more frequent removal than the process which produces high density carbon.

A recent study entitled Formation of Dense Carbon on Fused-Quartz wool for Spacecraft Life Support Application discloses that the introduction of quartz wool into the reactor vessel will result in high density carbon formation and increased efficiencies for methane conversion. However, the operating temperatures were still in excess of 1000° C.

Therefore, what is needed in this art is a method for converting methane gas producing hydrogen and carbon in which the operating temperatures are low, the carbon formed has a high density and the conversion efficiency remains high.

DISCLOSURE OF THE INVENTION

This invention is directed toward an improved methane conversion process in which the methane gas is introduced into a reactor vessel which has been packed with a glass fiber material having a layer of catalytic metal on the fibers, the reaction taking place at temperatures between 750° C. and 850° C. and the resulting carbon having a high density.

Also disclosed is a methane reactor in which the reactor vessel is packed with glass fibers having a layer of catalytic metal thereon resulting in a reactor which will convert methane gas to hydrogen and high density carbon at temperatures from about 750° C. to about 850° C.

Also disclosed is an improved system for the reclamation of oxygen from carbon dioxide exhaust gases wherein the carbon dioxide is passed through a concentrator and then the concentrated carbon dioxide is reacted in the presence of hydrogen to form water and methane, thereafter the water is electrolyzed to form hydrogen and oxygen and the methane is converted to hydrogen and carbon by passing through the reactor vessel of the present invention.

BEST MODE FOR CARRYING OUT THE INVENTION

The carbon dioxide conversion system for reclaiming oxygen is shown by reference to the figures. As shown therein, the process is a two step process resulting in the overall production of a high density carbon and water which may be disassociated to form hydrogen and oxygen.

The carbon dioxide is passed into the initial reactor 1 in which it is hydrogenated by contact with a hydrogenation catalyst (such as Hamilton Standard UASC 151G—20% by weight ruthenium on alumina granules) to form methane and water as described in the reaction: $CO_2 + 4H_2 \rightarrow CH_4 + 2H_2O$. These reaction products are then cooled to condense out the water which is separated using a conventional condenser/separator 2 (note for space applications a porous plate or rotary inertial condenser/separator is preferred).

The remaining reactant gas (methane) is then directed to a second stage reactor 3 in which the methane is converted to hydrogen gas and high density carbon. It may be desirable to pass the gas through a heating means such as a heat exchanger 4 prior to passing it into the second stage reactor. This reactor comprises a reactor vessel of thermally stable, material (typically a high temperature glass), packed with thermally stable, high temperature glass fibers having a layer of catalytic metal on them.

Figure 1:
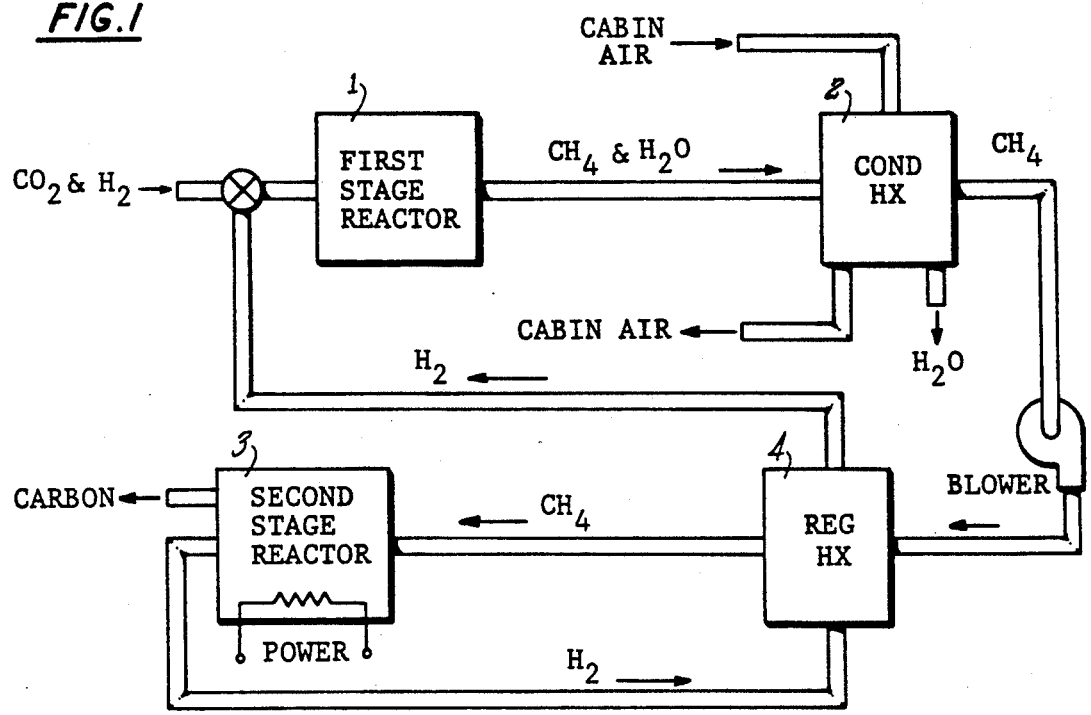
FIG. 1 shows a schematic of a carbon dioxide reclamation system according to the present invention.
Figure 2:
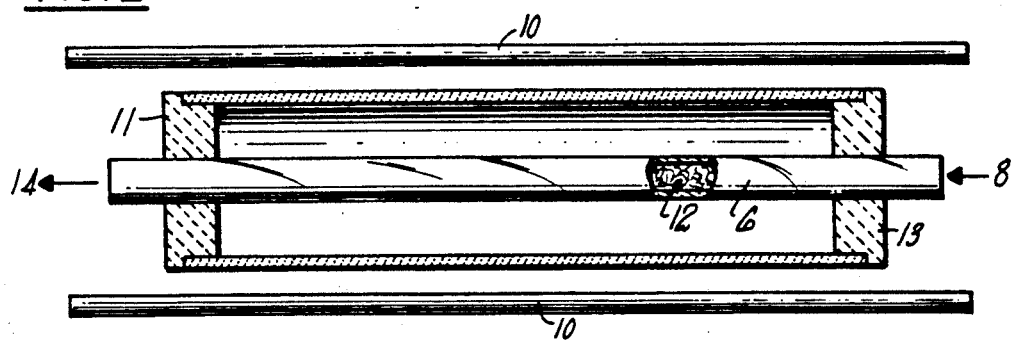
FIG. 2 shows a cross-sectional view of the methane reactor vessel of the present invention.

FIG. 2 shows a typical configuration of the proposed methane reactors. The reactor components are conventional and comprise a reactor vessel 6 in which the methane is introduced through an opening 8, and the hydrogen is removed through exit port 14. The reactor vessel is generally mounted in an electrically or heat insulating means 13. The reactor vessel is typically surrounded by a heating means 10 by which the temperature of the reactor vessel may be raised and maintained at the desired reaction temperature and some insulating materials 11 to ensure the efficient operation of the heater. Methane converters such as these are described in U.S. Pat. No. 4,452,676. The present invention introduces a packing of glass fibers 12 having a layer of catalytic metal on them which reduces the temperature at which the methane reaction takes place yet continues to form high density carbon at high conversion rates.

As has been stated, the basic components of the methane reactor, the heater, insulation, and reactor vessel are conventional. The heater can be by any conventional heating means such as a resistance furnace, which is preferred. An exemplary resistance furnace setup includes the use of firebrick and Globar silicon carbide rods available form Norton Company, Worcester, Mass. If a resistance heater is used, the coils are wrapped around the reactor vessel and then sufficient current supplied to the resistance heater from any conventional power source to produce the desired temperature.

The reactant vessels may be any shape which will lend itself to being packed with the catalyzed glass fibers, however, the preferred shape is in the form of a tube. The vessels should be formed of high temperature, thermally stable and chemically inert materials which do not lose their shape or deform at the operating temperatures of about 750° C. to about 850° C. These may be high temperature glasses, ceramics or metals. The preferred materials are high temperature quartz and high silica glasses (such as Vycor glass) available from Corning Glass Works, Corning, New York. The internal diameter of the vessel may be any size but typically it should range from about 20 centimeters to about 25 centimeters. The reason glass is preferred is that the carbon formed during the process is easily removed from the glass; whereas if metal components were used the carbon would adhere too strongly to the metal part and the entire reactor tube would have to be replaced when it was time to remove the carbon.

The reactant vessel is then packed with glass or glass-like fibers having a layer of metallic catalyst on the glass fibers (for purposes of this discussion glass and glass-like fibers are used interchangeably). The glass fibers should be thermally stable at the conversion temperatures, inert to the reaction and should have a high surface to volume ratio. Typical glass fibers useful in the operation of this invention are fused-quartz glass fibers, borosilica fibers etc., with the preferred being the fused-quartz fibers, such glass fibers should have a melt temperature and be stable at temperatures in excess of 850°. These fibers preferably will have surface to volume ratios of at least 1000 square centimeters surface area per cubic centimeter of volume with about 4000 to about 8000 square centimeters surface area per cubic centimeter packed volume being preferred. Additionally, although the diameter of the fibers is not limited, it is preferred that the average diameter of the glass fibers be about 2 micrometers to about 10 micrometers. Both the surface to volume ratio and the fiber diameter preferences are meant to enhance the reactive surface inside the reactor vessel. These glass fibers are generally in the form of a loosely woven mat; however, other configurations may be used so long as the fibers are coated with a metal catalytic layer and are capable of being compacted and placed into the reactor vessel without much destruction of the fibers.

These glass fibers must have a metal catalytic layer on them. This layer may be placed on the fibers using any conventional technique such as chemical vapor deposition from carbonyls of the metals, or electroless plating. The preferred method is through chemical vapor deposition of the metal carbonyls run in a mass transfer rate— limited regime to ensure uniformity of coating throughout the glass fiber thickness. These processes are well known to those skilled in the art and need not be detailed here. The metal catalytic layer formed should be selected from the group iron, cobalt, nickel, or palladium with nickel being preferred. The thickness or amount of catalytic material placed on the glass fiber substrate is not critical, however, the more catalytic surface area available the more efficient the conversion is likely to be. Typically the amount of catalyzed metal should be about 33% to about 67% weight fraction of the glass.

The amount and density of the packing material is limited by the ability of the methane to easily pass through the reactor vessel. The packing density of the glass fibers should be about 1% to about 4% by volume of the reactor vessel volume and about 1% to about 2% by volume of the reactor vessel being most preferred.

The operation of this methane converter may be followed in FIG. 2. The methane gas is introduced into the reactor vessel 6 through inlet opening 8 and flows under pressure through the reactor vessel 6. As it passes through the reactor vessel 6, it contacts the catalytic surface of the glass fibers 12 which have been heated to a temperature of between 750° C. and 850° C. The catalytic layer causes the methane to spontaneously break down to form high density carbon and hydrogen gas. The carbon is deposited onto the glass fibers and the hydrogen passes out of the reactor vessel through outlet 14.

The flow rate and the pressure at which the methane is forced through the reactor vessel will be a function of the packing density of the reactor vessel and the conversion efficiency of the reactor. These parameters will be easily discernible from simple experimentation.

EXAMPLE

A reactor was constructed having a reactor vessel of quartz glass in the form of a tube 60 centimeters long having an internal diameter of 4.5 centimeters and a wall thickness of 0.15 centimeters. The tube was purchased commercially from Quartz Scientific, Inc., Fairport Harbor, Ohio. The tube was heated by a molybdenum disilicide electrical resistance heater elements in a 10 centimeter high by 15 centimeter square heated zone of a fibrous-alumina insulated box furnace, built for methane conversion reactor testing. The reactor vessel was packed to a volume density of 2% with a 30 centimeter wide fused quartz wool mat rolled up and inserted into the center of the vessel. The glass mat was 1.0 centimeter thick and had an average fiber diameter of 9 micrometers. The quartz wool was purchased commercially from Quartz Products, Inc., Plainfield, N.J. The glass mat had a layer of nickel metal deposited on the glass fiber surface by chemical vapor deposition from nickel carbonyl. The average thickness of the metal layer was 1.0 micrometers.

The reactor was operated at a temperature of 350° C. and a methane flow rate of 100 sccm (standard cubic centimeters per minute). The conversion rate for the methane and the density of the carbon formed were compared to the prior art methods under their optimum conditions and the results are shown in the Table below.

TABLE

| DENSITY REACTOR PACKING | °C. TEMPERATURE | % CONVERSION SINGLE PASS | BULK DENSITY LB/FT3 |
|---|---|---|---|
| uncatalyzed quartz wool | 1200 | 75 | 45 |
| catalyzed quartz wool | 850 | 80 | 36 |
| Bosch Method | 650 | 6 | 20 |
| unpacked quartz tube | 1200 | 56 | 18 |

As may be seen form the above example, the present invention significantly lowers the reaction temperature at which the conversion takes place while maintaining a high conversion efficiency of the methane and high packing density of the resulting carbon. This results in a more efficient system which uses less energy yet still produces an efficient, long term, life cycle for the reactor. Additionally, the low temperatures at which these reactors operate allows for the use of less exotic, expensive and heavy materials in the construction of the reactor itself and also will prolong the useful life of the reactor vessel by as much as 100 times that of life expectancy when operated at the higher temperatures.

It should be understood that the invention is not limited to the particular embodiments shown and described herein, but that various changes and modifications may be made without departing from the spirit and scope of this novel concept as defined by the following claims.

I claim:

1. A methane conversion reactor comprising a high temperature reactor vessel, a means for heating the high temperature reactor vessel, a means for introducing methane into the reactor and a means for exiting resulting gases from the reactor vessel, wherein the improvement comprises a packing of high temperature metal catalyst coated glass fiber material positioned within the reactor vessel wherein said metal catalyst coated glass fiber material is capable of catalytically decomposing methane to produce carbon at temperatures between 750° C.–850° C. with a conversion efficiency of about 80%.

2. The reactor of claim 1 wherein the high temperature glass fibers are formed of fused-quartz wool.

3. The reactor of claim 1 wherein the high temperature glass fibers have an average diameter of about 2 micrometers to about 10 micrometers.

4. The reactor of claim 1 wherein the high temperature glass fibers are coated with a catalyst selected from the group consisting of cobalt, nickel, iron and palladium.

5. The reactor of claim 1 wherein the weight fraction of the catalytic layer to the high temperature glass fibers is about 33 percent to about 67 percent.

* * * * *